(12) United States Patent
Abuan et al.

(10) Patent No.: US 10,630,730 B2
(45) Date of Patent: Apr. 21, 2020

(54) NAT TRAVERSAL FOR MEDIA CONFERENCING

(71) Applicant: Apple Inc., Cupertino, CA (US)

(72) Inventors: Joe Abuan, Milpitas, CA (US); Berkat Tung, Sacramento, CA (US); Hyeonkuk Jeong, San Jose, CA (US); Joshua Graessley, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1036 days.

(21) Appl. No.: 14/063,823

(22) Filed: Oct. 25, 2013

(65) Prior Publication Data

US 2014/0052870 A1 Feb. 20, 2014

Related U.S. Application Data

(60) Continuation of application No. 13/277,889, filed on Oct. 20, 2011, now Pat. No. 8,572,172, which is a division of application No. 10/769,841, filed on Feb. 2, 2004, now Pat. No. 8,065,418.

(51) Int. Cl.
*H04L 29/06* (2006.01)
*H04L 29/08* (2006.01)
*H04L 29/12* (2006.01)

(52) U.S. Cl.
CPC ........ *H04L 65/1069* (2013.01); *H04L 29/125* (2013.01); *H04L 29/12566* (2013.01); *H04L 61/2564* (2013.01); *H04L 61/2589* (2013.01); *H04L 67/104* (2013.01)

(58) Field of Classification Search
CPC ............... H04L 65/1069; H04L 29/125; H04L 61/2589; H04L 67/104

USPC .......................... 709/201–203, 223–224, 227
See application file for complete search history.

(56) References Cited

U.S. PATENT DOCUMENTS

| | | |
|---|---|---|
| 5,777,989 A | 7/1998 | McGarvey |
| 6,360,265 B1 | 3/2002 | Falck et al. |
| 6,393,488 B1 | 5/2002 | Araujo |
| 6,523,068 B1 | 2/2003 | Beser et al. |
| 6,608,830 B1 * | 8/2003 | Hirano ................ H04L 12/4612 370/351 |
| 6,708,219 B1 | 3/2004 | Borella et al. |
| 6,754,709 B1 | 6/2004 | Gbadegesin |
| 6,781,982 B1 * | 8/2004 | Borella ............. H04L 29/12216 370/352 |
| 6,879,593 B1 * | 4/2005 | Kunze et al. ................. 370/401 |

(Continued)

OTHER PUBLICATIONS

B. Ford, "Network Address Translation and Peer-To-Peer Applications (NATP2P)"—Internet Draft, The Internet Society, Apr. 2003, 16 pages.

(Continued)

*Primary Examiner* — Minh Chau Nguyen
(74) *Attorney, Agent, or Firm* — Sterne, Kessler, Goldstein & Fox P.L.L.C.

(57) ABSTRACT

Methods for establishing a direct peer-to-peer ("P2P") connection between two computers are disclosed. In particular, the methods are designed to work in cases where one or both of the computers are connected to a private network, such private networks being interconnected via a public network, such as the Internet. The connections between the private network and the public network are facilitated by network address translation ("NAT").

20 Claims, 4 Drawing Sheets

(56) References Cited

U.S. PATENT DOCUMENTS

| | | | |
|---|---|---|---|
| 6,911,916 B1 * | 6/2005 | Wang | A61B 5/7475 340/3.7 |
| 6,978,317 B2 | 12/2005 | Anantha et al. | |
| 6,993,595 B1 | 1/2006 | Luptowski et al. | |
| 6,996,621 B1 | 2/2006 | Borella et al. | |
| 7,032,242 B1 | 4/2006 | Grabelsky et al. | |
| 7,079,520 B2 | 7/2006 | Feige et al. | |
| 7,227,872 B1 | 6/2007 | Biswas et al. | |
| 7,251,824 B2 | 7/2007 | Edwards et al. | |
| 7,260,644 B1 | 8/2007 | Shah et al. | |
| 7,290,060 B2 | 10/2007 | Kong | |
| 7,305,546 B1 | 12/2007 | Miller | |
| 7,328,280 B2 * | 2/2008 | Takeda et al. | 709/245 |
| 7,328,281 B2 | 2/2008 | Takeda et al. | |
| 7,366,188 B2 | 4/2008 | Kim et al. | |
| 7,380,011 B2 | 5/2008 | Li et al. | |
| 7,406,526 B2 | 7/2008 | Benchetrit et al. | |
| 7,406,709 B2 | 7/2008 | Maher et al. | |
| 7,461,150 B1 | 12/2008 | Boulia | |
| 7,496,097 B2 | 2/2009 | Rao et al. | |
| 7,522,618 B2 | 4/2009 | Hamamoto et al. | |
| 7,542,475 B2 | 6/2009 | Bar-Zakal | |
| 7,558,862 B1 | 7/2009 | Tyukasz et al. | |
| 7,574,523 B2 | 8/2009 | Traversat et al. | |
| 7,577,144 B2 | 8/2009 | Chang et al. | |
| 7,609,721 B2 | 10/2009 | Rao et al. | |
| 7,680,065 B2 | 3/2010 | Jennings | |
| 7,706,370 B2 | 4/2010 | Yang | |
| 7,716,369 B2 | 5/2010 | Le Pennec et al. | |
| 7,751,387 B2 | 7/2010 | Hwang et al. | |
| 7,796,616 B2 | 9/2010 | Kim | |
| 7,827,278 B2 | 11/2010 | Chen et al. | |
| 7,912,967 B2 * | 3/2011 | Mace et al. | 709/227 |
| 7,920,549 B2 | 4/2011 | Alt et al. | |
| 7,937,438 B1 | 5/2011 | Miller et al. | |
| 7,949,785 B2 * | 5/2011 | Alkhatib | G06Q 30/02 709/245 |
| 7,979,528 B2 | 7/2011 | Eisenberg et al. | |
| 7,992,199 B1 * | 8/2011 | Winick et al. | 726/11 |
| 8,032,583 B2 | 10/2011 | Liu et al. | |
| 2001/0040496 A1 | 11/2001 | Wang | A61B 17/00 340/3.5 |
| 2001/0050911 A1 * | 12/2001 | Eastman | H04L 12/2856 370/352 |
| 2002/0138552 A1 | 9/2002 | DeBruine et al. | |
| 2004/0124964 A1 * | 7/2004 | Wang | A61B 17/00 340/3.54 |
| 2004/0128554 A1 | 7/2004 | Maher et al. | |
| 2004/0139228 A1 * | 7/2004 | Takeda | H04L 29/12066 709/245 |
| 2005/0010668 A1 | 1/2005 | Chen | |
| 2005/0015496 A1 * | 1/2005 | Guo | H04L 29/06 709/227 |
| 2006/0159065 A1 | 7/2006 | Jenning | |
| 2008/0013524 A1 | 1/2008 | Hwang et al. | |
| 2008/0288580 A1 | 11/2008 | Wang et al. | |

OTHER PUBLICATIONS

C. Huitema, "Teredo: Tunnelling IPv6 Over UDP Through NATs"—Internet Draft, The Internet Society, Aug. 13, 2002, 53 pages.

M. Handley, "SIP: Session Initiation Protocol". The Internet Society, Mar. 1999. 153 pages.

J. Rosenberg, "STUN—Simple Traversal of User Datagram Protocol (UDP) Through Network Address Translators (NATs)". The Internet Society, Mar. 2003, 47 pages.

* cited by examiner

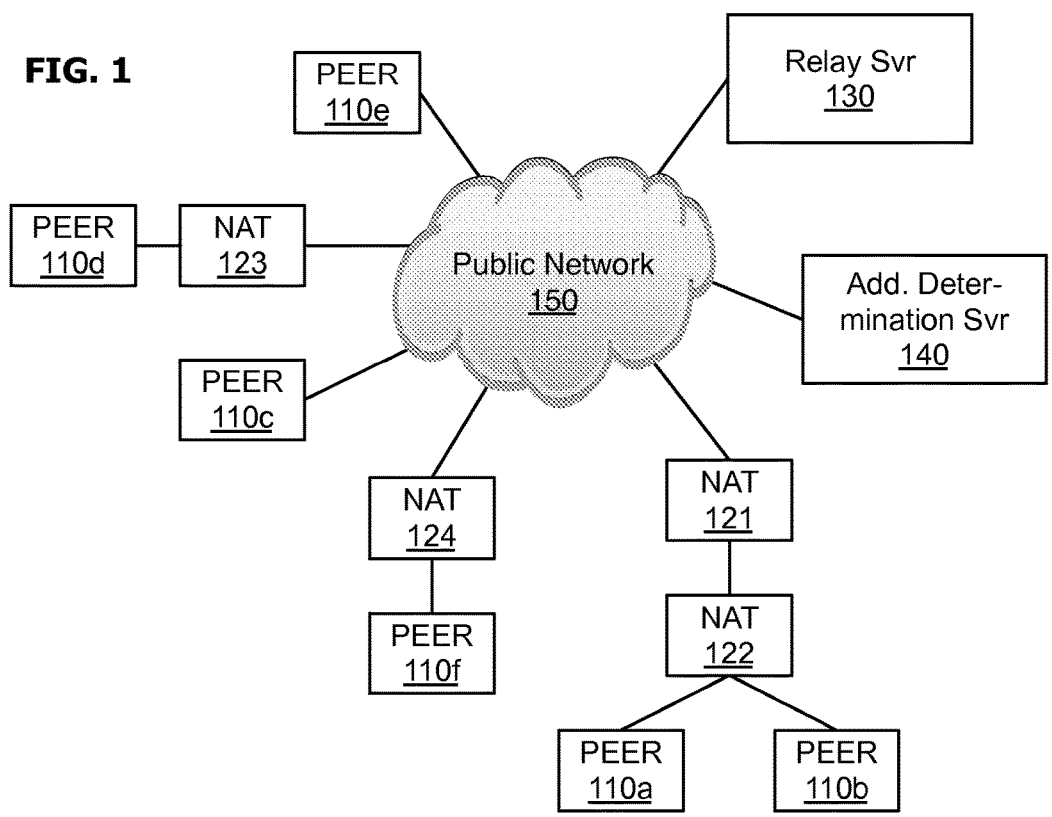
FIG. 1
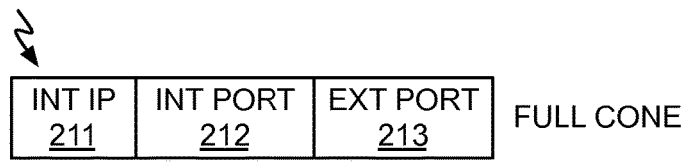
FULL CONE
FIG. 2
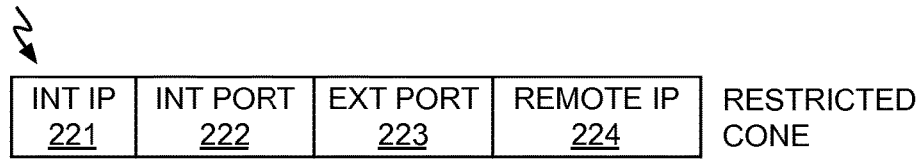
RESTRICTED CONE
PORT RESTRICTED CONE

| PEER-0 | PEER-1 | PROCESS |
| --- | --- | --- |
| PUBLIC | PUBLIC | NOT NEEDED, BOTH SYSTEMS ADVERTISE PUBLIC ADDRESSES |
| PUBLIC | PRIVATE | ALPHA PROCESS (SEE FIG. 4) |
| PRIVATE | PRIVATE | IF ONE PEER IS FULL CONE, ALPHA PROCESS WORKS, ELSE BETA PROCESS (SEE FIG. 5) |
| PRIVATE | PRIVATE | BETA PROCESS WORKS EVEN WHEN ONE OR BOTH PEER SYSTEMS ARE BEHIND MULTIPLE NATS (SEE FIG. 5) |

FIG. 3

NAT TRAVERSAL FOR MEDIA CONFERENCING

The instant application is a continuation of, and hereby claims priority under 35 U.S.C. § 120 to, pending U.S. patent application Ser. No. 13/277,889, which is titled "NAT Traversal for Media Conferencing," by the same inventors, which was filed on 20 Oct. 2011. The instant application also claims priority to U.S. patent application Ser. No. 10/769,841, which is titled "NAT Traversal for Media Conferencing," by the same inventors, which was filed on 2 Feb. 2004, which issued as U.S. Pat. No. 8,065,418 on 22 Nov. 2011, and to which parent application Ser. No. 13/277,889 claims priority. These applications are incorporated by reference.

BACKGROUND

The invention relates generally to computer systems and more particularly, but not by way of limitation, to a technique for establishing a peer-to-peer ("P2P',) connection between two computers in the presence of network address translation ("NAT"). Establishing a P2P connection between two computers is useful for the implementation of various applications, including, for example, gaming, file sharing, and media (audio, video, etc.) conferencing. Although the system herein is described with reference to Internet Protocol ("IP") networks, the invention is not so limited and could be used with other network types.

Large public networks, such as the Internet, frequently have connections to smaller private networks, such as those maintained by a corporation, Internet service provider, or even individual households. By their very nature, public networks must have a commonly agreed upon allocation of network addresses, i.e., public addresses. For a variety of reasons, some of which are discussed in more detail below, maintainers of private networks often choose to use private network addresses for the private networks that are not part of the commonly agreed upon allocation. Thus, for network traffic from the private network to be able to traverse the public network, some form of NAT is required.

As is known to those skilled in the art, the basic principle of NAT is that a private network, having a private addressing scheme, may be connected to a public network, having a standardized addressing scheme, e.g., the Internet through a network address translator. A network address translator (details of which are known to those skilled in the art) alters the data packets being sent out of the private network to comply with the addressing scheme of the public network. Particularly, the network address translator replaces the originating private address and port number of a packet with its own public address and an assigned port number. A network address translator also alters the data packets being received for computers on the private network to replace the destination public address and port number with the correct private address and port number of the intended recipient. As used herein, the term address should be construed to include both an address and a port number if appropriate in the context, as would be understood by one of ordinary skill in the art.

NAT has become increasingly common in modern network computing. One advantage of NAT is that it slows the depletion of public network address space. For example, TCP/IP addressing, which is used on the Internet, comprises four strings of three digits each, thus providing a finite address space. Additionally, certain portions of this address space are reserved for particular uses or users, further depleting the actual number of addresses available. However, if NAT is used, a private network or subnet may use an arbitrary number of addresses, and still present only a single, standardized public address to the outside world. This makes the number of available addresses practically limitless, because each private network could, theoretically, use exactly the same private addresses.

Another advantage provided by NAT is increased security. The increased security arises in part from the fact that those on the public network cannot determine the actual (i.e., private) network address of a computer on a private network. This is because only the public address is provided on the public network by the network address translator. Additionally, this public address may correspond to any number of computers on the private network. This feature also facilitates network address translators acting as firewalls, because data received by the network address translator that does not correspond to a request from a computer on the private network may be discarded.

While this security works well in conventional client-server computing, where connections to a "server" on the public network are initiated by a "client" on the private network, it poses problems for P2P connections. In many P2P applications, it is desirable to establish a connection directly between two computers (i.e., peers) that would be considered clients in a traditional sense, but that may act both as clients and as servers in the context of the P2P connection. Establishing a direct connection becomes increasingly difficult if one or both of the peers is located behind one or more levels of NAT.

Historically, there have been various techniques for establishing a P2P connection in the presence of NAT. These techniques include Relaying, Connection Reversal, UDP Hole Punching, UDP Port Number Prediction, and Simultaneous TCP Connection Initiation. Each of these techniques suffers from various deficiencies that render them undesirable for various applications. For example, Relaying increases network overhead and latency, which is undesirable for timing critical applications such as video conferencing or gaming. Connection Reversal will only work if only one of the peers is located behind a network address translator. UDP Hole Punching, as the name implies, works well only with UDP connections and is less successful using other transport layer protocols, such as TCP. UDP Port Number Prediction requires predictable behavior by the various components, and is also geared toward UDP connections. Simultaneous TCP Connection Initiation requires a degree of luck, both with regard to addressing and port assignment and connection timing, resulting in a fragility that renders it unsuitable for general application.

Thus, it would be beneficial to provide a means to permit computers each located behind one or more NAT layers to establish a direct, P2P connection in a way that is efficient, reliable, and requires minimal redesign of existing network infrastructure.

SUMMARY

The present invention relates to establishing a direct P2P connection between computers wherein one or both of the computers are located behind one or more layers of NAT. In one embodiment, an initiating computer sends a message to the receiving computer by way of a Relay server. The Relay server retransmits this request to the receiving computer, which has already established a connection with the Relay server. Upon receiving this request, the receiving computer determines a list of addresses on which it believes it can be contacted and transmits this information to the Relay server, which then re-transmits the information to the initiating computer. Upon receiving this information, the receiving computer sends direct initiation messages to the addresses provided by the receiving computer until a direct P2P connection is established. If a connection cannot be established, the initiating computer sends a message so indicating to the Relay server, which re-transmits this information to the receiving computer. The receiving computer then starts the process over, this time acting as the initiating computer.

In another embodiment, both the initiating computer and the receiving computer have logged into a Relay server. An initiating computer determines its public address by querying an address-determination server. It then generates a list of addresses on which it believes it can be contacted and transmits this information to the Relay server, which re-transmits this information to the receiving computer. On receiving the initiating computer's address information, the receiving computer also determines its public address and generates a list of addresses on which it believes it can be contacted. The receiving computer also sends a sequence of messages to the initiating computer, which are discarded by a network address translator behind which the initiating computer is located, but which set up the receiving computer's network address translator to later accept a connection. The receiving computer then transmits the addresses on which it believes it can be contacted to the Relay server, which re-transmits this information to the initiating computer. The initiating computer, having received this information, sends a sequence of initiation messages directly to the addresses provided by the receiving computer, and these messages are able to pass through the receiving computer's network address translator because of the earlier sequence of messages sent by the receiving computer.

BRIEF DESCRIPTION OF THE DRAWINGS

FIG. 1 shows a network topology in which the teachings of the present invention may be used.

FIG. 2 illustrates the address header information in connection with various types of network address translation.

FIG. 3 illustrates an operational matrix for selecting which technique in accordance with the present invention is necessary to establish a connection between two peers.

DETAILED DESCRIPTION

Figure 4:
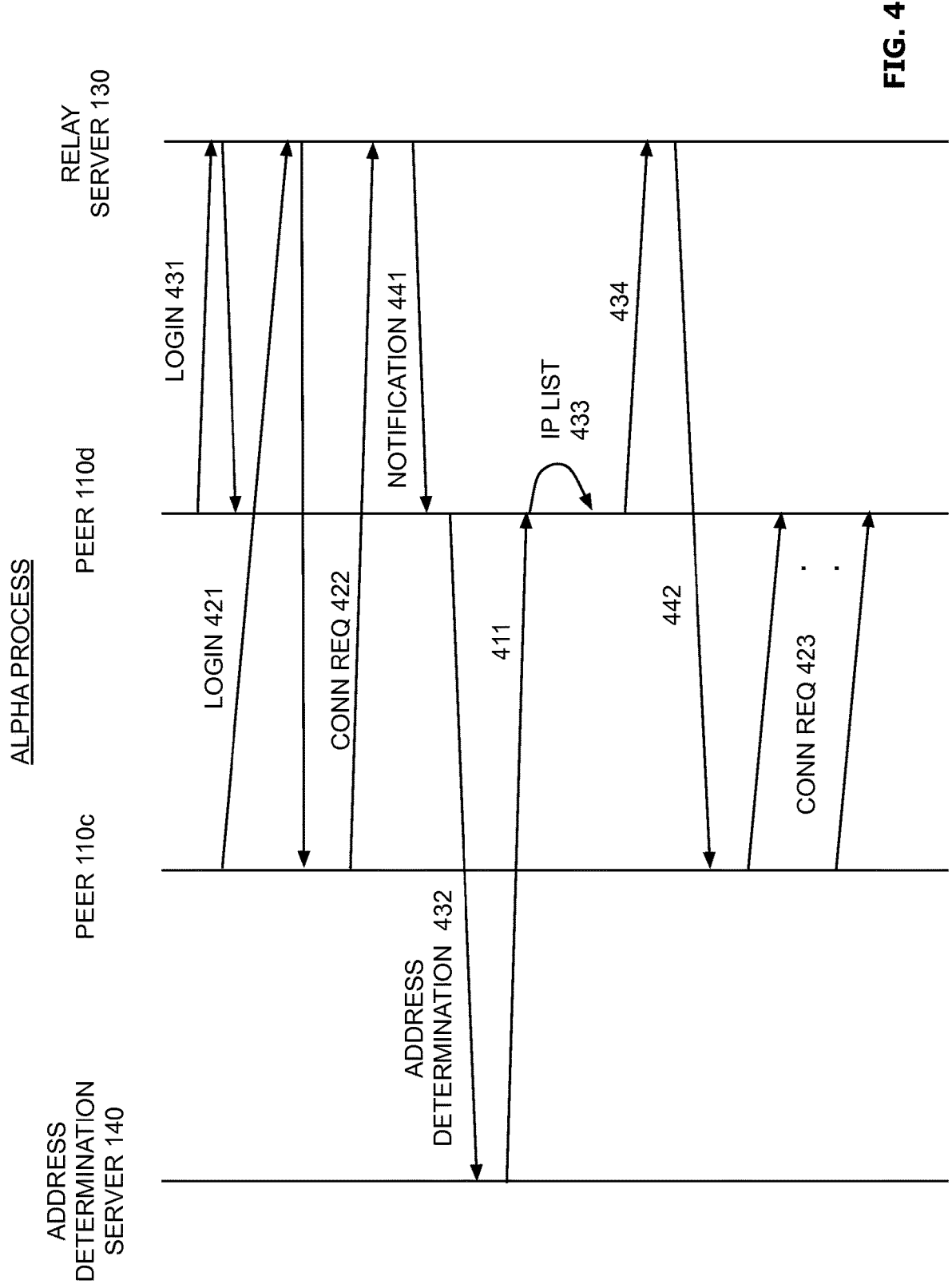
FIG. 4 illustrates the sequence of messages in one technique of establishing a peer-to-peer connection in accordance with the present invention.

Techniques (methods and devices) to establish a peer-to-peer ("P2P") connection between computers each located behind one or more levels of network address translation ("NAT") are described herein. The following embodiments of the invention, described in terms applications compatible with computer systems manufactured by Apple Computer, Inc. of Cupertino, Calif., are illustrative only and should not be considered limiting in any respect.

Turning now to FIG. 1, a general network topology in which the present invention may be used is illustrated. A plurality of "client" or "peer" computers 110a through 110f are interconnected by public network 150, which could be, for example, the Internet. Peer computers 110c and 110e are directly connected to public network 150. Peer computers 110d and 110f are connected behind network address translators 123 and 124. Still other peer computers 110a and 110b are connected behind two layers or levels of network address translators, 121 and 122. Relay server 130, which is used in the relaying technique of the prior art is also connected to public network 150. Finally, Address Determination server 140, used to provide a peer's public address in accordance with the teachings of the present invention, is also connected to public network 150. Address Determination server 140 provides the means for a peer to determine its public address and port number as assigned by a network address translator behind which the peer resides.

With reference now to FIG. 2, the address headers used in connection with three common types of NAT are illustrated. A first type of NAT is a full cone NAT, which means that all requests from the same internal (private) IP address and port are mapped to the same external (public) IP address and port. In this type of NAT, any external host can send a packet to the internal host by sending the packet to the mapped external address and host. Address header information 210 for a full cone NAT thus includes internal IP address 211, internal port assignment 212, and external port assignment 213. (The external address will be the public address of the network address translator.)

A second type of NAT is a restricted cone NAT, which means that all requests from the same internal IP address and port are mapped to the same external IP address and port. However, unlike a full cone NAT, an external host can send a packet to the internal host only if the internal host had previously sent a packet to the IP address of the external host. Thus data header 220 includes the same information as with a full cone NAT (internal IP address 221, internal port assignment 222, and external port assignment 223) and also includes additional field 224 that identifies the remote address to which a packet has previously been sent.

A third type of NAT is a port-restricted cone NAT, which is a restricted cone NAT further restricted to port numbers. Specifically, an external host can send a packet to an internal host only if the internal host had previously sent a packet to the specific IP address and port from which the "return" packet originated. Thus, to successfully traverse a port restricted cone NAT, address header 230 must include all the information in a restricted cone header (i.e., internal IP address 231, internal port assignment 232, external port assignment 233, remote IP address 234) and the additional information of the remote port to which a packet has previously been sent.

Additionally, a network address translator may also use port address translation ("PAT"). When PAT is used, the network address translator will use a different port for each outbound address/port combination. If PAT is not implemented, a single port number is used for each client.

FIG. 3 illustrates an operational matrix for determining which process in accordance with the present invention may be used for establish a P2P connection between two peers. For purposes of the following discussion, it is assumed that PEER-0 is initiating the connection with PEER-1. As can be seen from FIG. 3, if both PEER-0 and PEER-1 are located on the public network, as with peers 110c and 110e of FIG. 1, then no special technique is needed as each computer's packets indicate its true address and port number. If PEER-0, located on the public network, attempts to initiate a connection with PEER-1 located on a private network, as with peer 110c attempting to initiate a connection with peer 110d, then a first technique ALPHA, discussed below in connection with FIG. 4 may be used. In the situation where both PEER-0 and PEER-1 are both located on private networks, as with peer 110a attempting to initiate a connection with peer 110*d*, the technique ALPHA will work if one of the peers is behind a full-cone network address translator (described above with reference to FIG. 2). Otherwise, a second technique BETA, discussed below in connection with FIG. 5 must be used. Technique BETA will work for establishing a connection between two peers each located on a private network, even if both peers are located behind multiple NAT layers, as with peers 110*a* and 110*b* of FIG. 1.

Turning now to FIG. 4, first process ALPHA for establishing a connection between initiating peer 110*c* located on public network 150 and receiving peer 110*d* located behind network address translator 123 is illustrated. A P2P connection can only be established with peer 110*d* if this peer has previously logged in to some third party server, for example, Relay server 130. Thus peer 110*d* transmits login message 431 to Relay server 130. Initiating peer 110*c* must also login to Relay server 130, by transmitting login message 421. Provided that both peers 110*c* and 110*d* have logged into Relay server 130, initiating peer 110*c* may then request a connection with peer 110*d* by sending connection request message 422 to Relay server 130, which acts as an intermediary. Relay server 130 then transmits this information to peer 110*d* as notification message 441.

Upon receiving notification message 441 from Relay server 130 that a connection is requested, peer 110*d* transmits address-determination message 432 to Address Determination server 140. The purpose of this message is solely for allowing peer 110*d* to determine its public IP address and port number assignment, which are assigned by network address translator 123. Address Determination server 140 returns reply message 411 to peer 110*d*, from which peer 110*d* can determine its public IP address and port assignment.

Peer 110*d*, having determined its port assignment generates IP-List 433, which is a list of private IP addresses and corresponding ports on which peer 110*d* can receive a connection. IP-List 433 also includes Flipped List, which is the binary complement of the listing of IP address and port combinations. It will be recognized that a Flipped-List may be generated in accordance with any user-specified transformation of the IP-List's contents (a binary complement is but one transformation). The flipped list is used because some network address translators interrogate outgoing packets and, if they find a local (private) IP address, convert it to the network address translator's external (public) IP address. This action would destroy IP-List 433, which is used by peer 110*c* for initiating the connection. Once generated, IP-List 433 is transmitted to Relay server 130, which re-transmits the IP-List 442 to peer 110*c*.

Taking the information from IP-list 442, peer 110*c* then begins initiating a direct P2P connection with peer 110*d*. Specifically, peer 110*c* steps through the addresses and ports contained in IP-list 442 issuing connection requests 423 to peer 110*d* until it is able to establish a connection with peer 110*d* (using the "flipped" aspect of IP List 442 if necessary). In one embodiment, session initiation protocol ("SIP") invitation messages comprise connection requests 423. Generally, connection request messages 423 after issued one after another, with a specified time delay between each transmission. For example, three (3) seconds. If peer 110*c* is unable to establish a connection with peer 110*d*, peer 110*c* can ascertain that peer 110*d* is behind a network address translator and/or firewall and that network address translator and/or firewall is restricted. Peer 110*c* would then contact Relay server 130 and ask the Relay server to have peer 110*d* contact peer 110*c*. At that time, the process of FIG. 4 is repeated, but with peer 110*d* trying to initiate communication.

Figure 5:
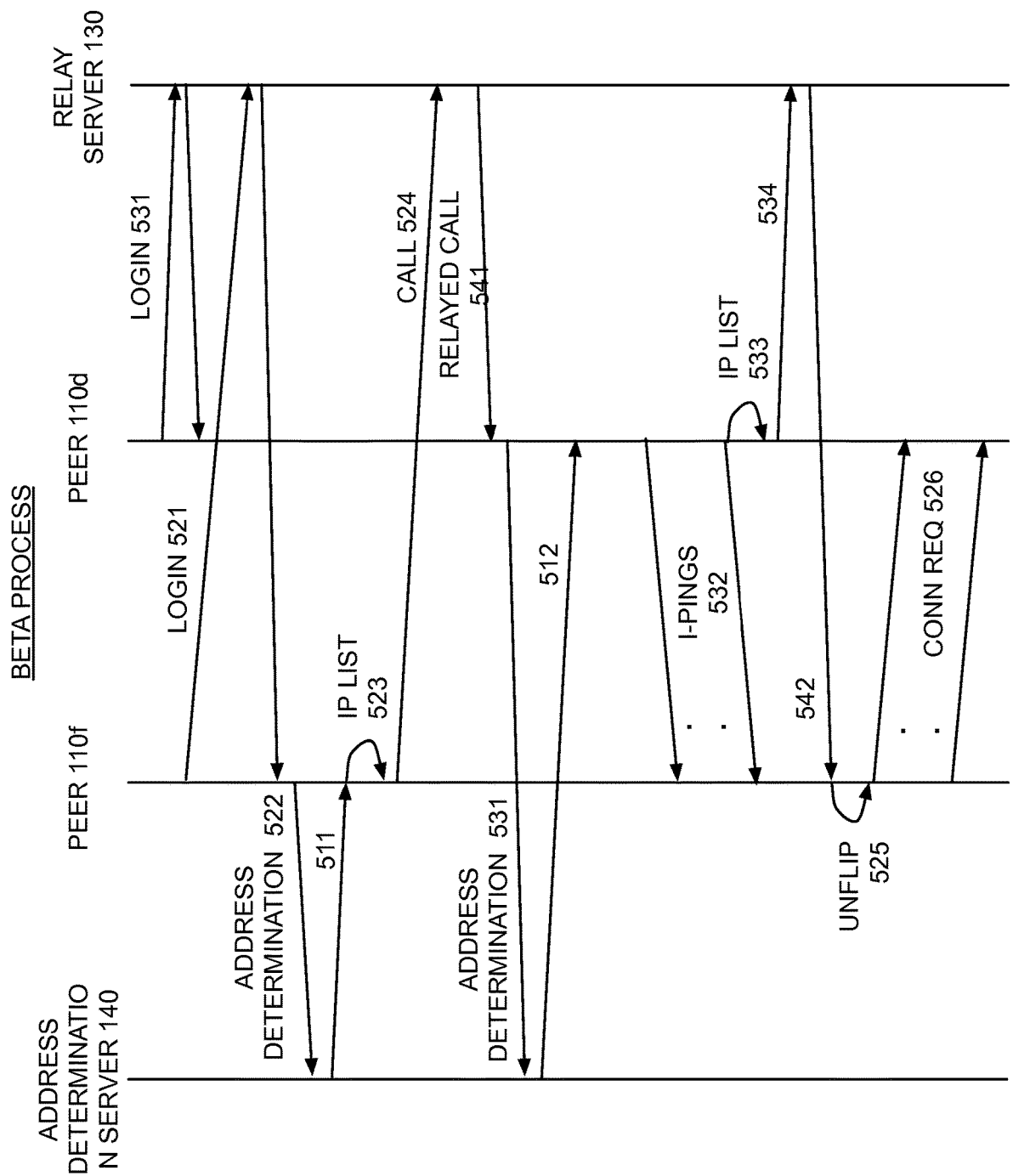
FIG. 5 illustrates the sequence of messages in another technique of establishing a peer-to-peer connection in accordance with the present invention.

Turning now to FIG. 5, process BETA is illustrated which works regardless of which peer initiates communication and regardless of how many network address translators or firewalls either or both peers are behind. For purposes of explanation of FIG. 5, it is assumed that peer 110*f* is initiating a P2P connection with peer 110*d*. The beginning of the process requires both peers to have logged onto Relay server 130, which is done by the transmission of logon message 521 by peer 110*f* and logon message 531 by peer 110*d*. To initiate a P2P session, peer 110*f* transmits address detection message 522 to Address Detection server 140.

As with method ALPHA described above, address determination message 522 allows peer 110*f* to determine its public IP address and port number. Address Determination server 140 returns message 511 to peer 110*f*, from which peer 110*f* can determine its public IP address and port assignment. Having determined its IP address and port assignment, peer 110*f* then generates IP-List 523, which is a list of local IP addresses and corresponding ports. As with method ALPHA described above, IP-List 523 also includes a flipped List, i.e., the binary complement of the listing of IP address and port combinations. Once generated, IP-List 523 is transmitted to peer 110*d* by way of Relay server 130 as part of call message 524.

Peer 110*d*, upon receiving peer 110*f*'s IP-list 523 as part of relayed call message 541 from Relay server 130, then sends its own address determination message 531 to Address Determination server 140 so that peer it may determine its public IP address and port number. Address Determination server 140 returns message 512 to peer 110*d* in which its public IP address and port assignments are identified. Peer 110*d* then begins sending a series of I-Ping messages 532 to peer 110*f*. In one embodiment, each I-Ping message 532 is a junk UDP packet, and one is sent to each of peer 110*f*'s IP-List entries. While each I-Ping packet is dropped by peer 110*f*'s network address translator, these packets set up peer 110*d*'s network address translator to later receive and accept an incoming connection request message (e.g., a SIP invitation message).

Having determined its IP address and port assignment, peer 110*d* then generates its own IP-List 533, which also includes a flipped list. Once generated, IP-List 533 is transmitted to peer 110*f* by way of Relay server 130 as message 534. Relay server 130 re-transmits this information via message 542 to peer 110*f*, which determines the IP address/port pairs in unflip operation 525. Peer 110*f* then sends a connection request message 526 (e.g., a SIP invitation message) to each IP/port pair in peer 110*d*'s IP-List until a connection is received and accepted. Once one of the connection request messages is accepted, a P2P connection is established directly between peer 110*f* and peer 110*d*. As described above, individual connection request messages may be staggered in time such as, by three (3) seconds. As previously noted, process BETA described above may be used with all types of connections because neither peer knows or cares if its targeted system is public or private or how many layers of NAT are present.

While the invention has been disclosed with respect to a limited number of embodiments, numerous modifications and variations will be appreciated by those skilled in the art. It is intended that all such variations and modifications fall with in the scope of the following claims.

The invention claimed is:

1. A method of initiating a peer-to-peer network connection from a first computer to a second computer across a public network, wherein at least one of the first and second computers is on a private network and is connected to the public network through a network address translator, the first and second computers having each established a connection to a common Relay server, the method comprising:
   sending an address-determination message from the first computer to an address-determination server;
   receiving at the first computer a reply to the address-determination message, wherein the reply comprises a public address and a port assignment for the first computer;
   generating a plurality of private addresses corresponding to the first computer based at least in part on the public address and the port assignment for the first computer;
   composing and sending from the first computer to the common Relay server for retransmitting to the second computer, a message comprising a request to initiate a first peer-to-peer network connection and the plurality of private addresses corresponding to the first computer;
   receiving from the common Relay server a message, at the first computer, originating at the second computer and comprising a plurality of private addresses corresponding to the second computer; and
   sending a request, from the first computer, to initiate the first peer-to-peer network connection to the plurality of private addresses corresponding to the second computer in sequence until the first peer-to-peer network connection is established between the first and second computers.

2. The method of claim 1, wherein the plurality of private addresses corresponding to the first computer and the plurality of private addresses corresponding to the second computer each comprise one or more IP addresses and one or more port numbers.

3. The method of claim 2, wherein the message sent from the first computer comprising the plurality of private addresses corresponding to the first computer further comprises a specified transformation of at least one of the plurality of private addresses corresponding to the first computer.

4. The method of claim 3, wherein the specified transformation comprises a binary complement transformation.

5. The method of claim 2, wherein the message originating at the second computer comprising the plurality of private addresses corresponding to the second computer further comprises a specified transformation of at least one of the plurality of private addresses corresponding to the second computer.

6. The method of claim 5, wherein the specified transformation comprises a binary complement transformation.

7. The method of claim 1, wherein the address-determination server is a server other than the common Relay server.

8. The method of claim 1, wherein at least one of the plurality of private addresses corresponding to the first computer enables direct addressing of the first computer by the second computer.

9. The method of claim 1, wherein the generating further comprises:
   generating ports corresponding to the plurality of private addresses corresponding to the first computer based at least in part on the public address and the port assignment for the first computer.

10. The method of claim 1, wherein the composing and sending further comprises:
    composing and sending the message based on the first and second computers having logged into the common Relay server.

11. A non-transitory program storage device having instructions stored therein for causing a processor to initiate a peer-to-peer network connection from a first computer to a second computer across a public network, wherein at least one of the first and second computers is on a private network and is connected to the public network through a network address translator, the first and second computers having each established a connection to a common Relay server, the instructions comprising:
    instructions to transmit an address-determination message from the first computer to an address-determination server;
    instructions to receive at the first computer a reply to the address-determination message, wherein the reply comprises a public address and a port assignment for the first computer;
    instructions to generate a plurality of private addresses corresponding to the first computer based at least in part on the public address and the port assignment for the first computer;
    instructions to compose and send from the first computer to the common Relay server for re-transmitting to the second computer a message comprising a request to initiate the peer-to-peer network connection and the plurality of private addresses corresponding to the first computer;
    instructions to receive from the common Relay server a message originating at the second computer and comprising a plurality of private addresses corresponding to the second computer; and
    instructions to send a request to initiate the peer-to-peer network connection to the plurality of private addresses corresponding to the second computer in sequence until the peer-to-peer network connection is established between the first and second computers.

12. The non-transitory program storage device of claim 11, wherein the plurality of private addresses corresponding to the first computer and the plurality of private addresses corresponding to the second computer each comprise one or more IP addresses and one or more port numbers.

13. The non-transitory program storage device of claim 12, wherein the message sent from the first computer comprising the plurality of private addresses corresponding to the first computer further comprises a specified transformation of at least one of the plurality of private addresses corresponding to the first computer.

14. The non-transitory program storage device of claim 13, wherein the specified transformation comprises a binary complement transformation.

15. The non-transitory program storage device of claim 12, wherein the message originating at the second computer comprising the plurality of private addresses corresponding to the second computer further comprises a specified transformation of at least one of the plurality of private addresses corresponding to the second computer.

16. The non-transitory program storage device of claim 15, wherein the specified transformation comprises a binary complement transformation.

17. The non-transitory program storage device of claim 11, wherein the address-determination server is a server other than the common Relay server.

18. A first device on a private network and connected to a public network through a network address translator, the first device comprising:

a network interface; and at least one processor communicatively coupled to the network interface, the at least one processor configured to execute instructions stored on a memory, causing the at least one processor to:

transmit an address-determination message to an address-determination server;

receive a reply to the address-determination message, wherein the reply comprises a public address and a port assignment for the first device;

generate a plurality of private addresses corresponding to the first device based at least in part on the public address and the port assignment for the first device;

compose and send to a Relay server for re-transmitting to a second device a message comprising a request to initiate a peer-to-peer network connection to the second device across the public network and the plurality of private addresses corresponding to the first device;

receive from the Relay server a message originating at the second device and comprising a plurality of private addresses corresponding to the second device; and send a request to initiate the peer-to-peer network connection to the plurality of private addresses corresponding to the second device in sequence until the peer-to-peer network connection is established between the first device and the second device.

19. The method of claim 1, further comprising:

sending from the first computer to the common Relay server for retransmitting to the second computer, a message indicating that the first peer-to-peer network connection between the first and second computers cannot be established when the first peer-to-peer network connection is unsuccessful after a specified time delay.

20. The method of claim 19, wherein the second computer initiates a second peer-to-peer network connection to the plurality of private addresses corresponding to the first computer in sequence until the second peer-to-peer network connection is established between the first and second computers when the first peer-to-peer network connection is unsuccessful.

\* \* \* \* \*